April 7, 1964 W. E. SEMPLE 3,128,336

FIBER PRINTING

Filed April 4, 1962 2 Sheets-Sheet 1

INVENTOR
WILLIAM E. SEMPLE
BY Paul D. Carmichael
ATTORNEY 3,128,336

FIBER PRINTING

William E. Semple, Endicott, N.Y., assignor to International Business Machines Corporation, New York, N.Y., a corporation of New York Filed Apr. 4, 1962, Ser. No. 185,134
12 Claims. (Cl. 178—6.6)

The present invention relates generally to the printing and reproducing arts and more particularly to a system for receiving input information in the form of electrical signals and providing as an output a document having indicia printed thereon representative of the input information.

Many types of reproducing techniques have been proposed and used in the prior art. Some of these techniques make use of electrostatic phenomena in that the input information is recorded as an electrostatic image on a record medium, such as a specially prepared metallic cylinder or tape. Input information in the form of electrical signals energizes an electrostatic generator, such as a cathode ray tube, and an electrostatic image corresponding to the input information is placed on the record medium. The latent electrostatic image is then developed by causing suitably charged electroscopic powder to impinge upon the record medium, for example. The powder is charged so that it is attracted and adheres to the latent electrostatic image itself or the remaining portion of the record medium. The electroscopic powder produces a visible record corresponding to the input information supplied to the electrostatic generator. The record medium itself may define the resultant output document or the developed image can be transferred to a suitable base or carrier by conventional printing techniques.

Briefly, the present invention relates to apparatus for printing or reproduction wherein the fibers on a fibrous record medium are oriented in accordance with input information and the selectively oriented fibers are thereafter marked or inked so that the same are distinguished from the remaining fibers. The fibers on a fibrous record medium are initially conditioned to grossly orient the fibers in a preferred direction. This is accomplished by electrostatic means, mechanical means or combinations thereof and all of the fibers may be depressed and oriented in one direction after this conditioning. The record medium is then acted upon by an electrostatic generating means such as a cathode ray gun or an electrostatic printing tube, which is responsive to the input information. The electrostatic generating means selectively orients in a second direction those fibers corresponding to the input information by depositing an electrostatic charge thereon. The record medium at this time has a pattern of raised or elevated fibers thereon representative of the input information. The tips of the raised fibers are then inked or otherwise marked by fiber marking means so that the same are easily distinguished from the fibers which are depressed.

The record medium itself is the output document in one embodiment of the invention. In another embodiment of the invention, the record medium is a continuous fibrous member and the developed visual image of the input information is transferred to and printed on a base or carrier, such as a web of paper. The transferring or printing operation is accomplished by engaging the carrier or base with the elevated and marked tips of the fibrous record medium. The fibrous record medium is then subjected to a cleaning operation where all traces of the ink or other marking material are removed. In both embodiments of the invention, the electrostatic generating means may be responsive to transducing means which convert the visual information on a master document to electrical signals so that a reproduction of the master document is provided.

It is the primary or ultimate object of this invention to provide apparatus for printing wherein input information signals are employed to orient selected fibers on a fibrous record medium in a preferred direction and those fibers which are oriented in the preferred direction are thereafter marked to provide a visual pattern corresponding to the input information signals. The orientation of the fibers in response to the input information signals is accomplished by an electrostatic generating means. The electrostatic generating means comprises electron beam generating means having conventional deflection circuitry whereby an electrical charge is deposited on those fibers corresponding to the input information signals.

Another object of the invention is to provide apparatus of the type set forth above which is highly versatile and is adapted to be employed in a large number of applications. For example, the disclosed apparatus may be used in a system for reproducing documents, providing a printed output for digital data processing apparatus or providing a typewriter.

A further object of the invention is the provision of fiber printing apparatus having the characteristics defined above which is highly simplified in construction and operation.

The foregoing and other objects, features and advantages will be apparent from the following more particular description of preferred embodiments of the invention, as illustrated in the accompanying drawings.

Figure 1:
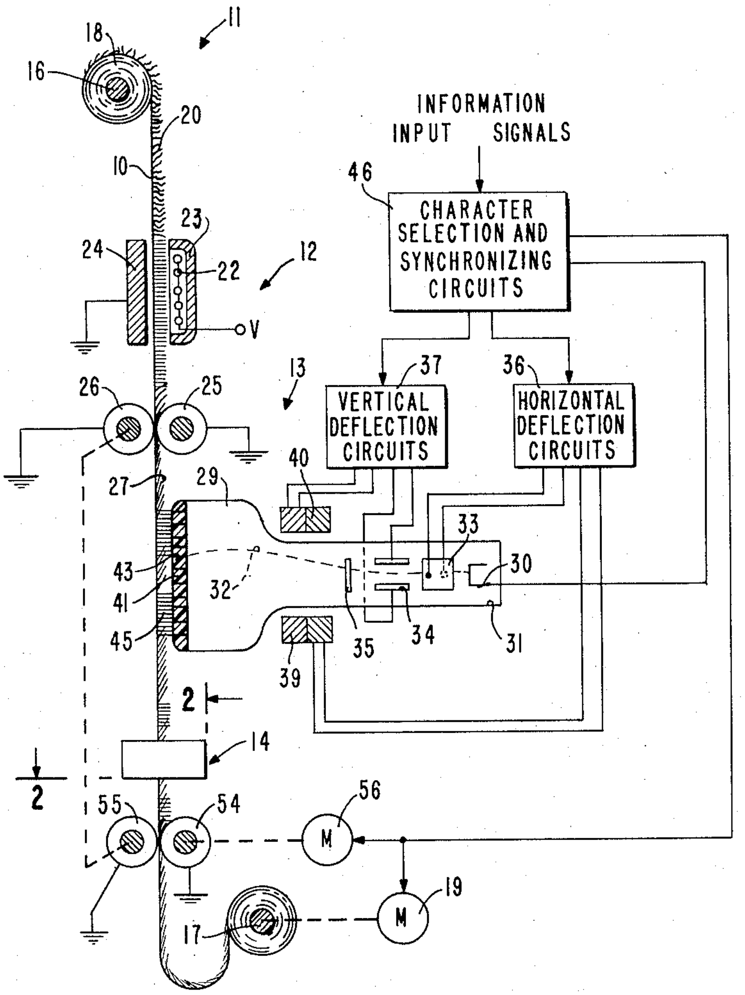
FIGURE 1 is a schematic view of illustrative apparatus for practicing one form of the invention.
Figure 2:
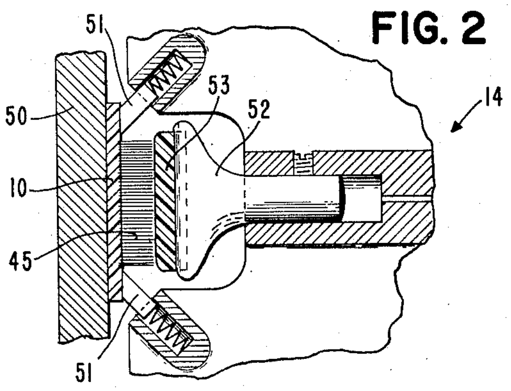
FIGURE 2 is an enlarged sectional view of the marking means employed in the apparatus of FIGURE 1 taken generally along the section line 2—2.

Referring now to the drawings and initially to FIGURES 1 and 2 thereof, there is shown fiber printing apparatus constructed and operated in accordance with the teachings of the present invention. In general, the fiber printing apparatus is adapted to treat a record medium 10 in such a manner that the record medium has a visual pattern recorded thereon corresponding to information input signals. The record medium 10 is fibrous and this term, as employed in the present specification, means that at least one surface of the record medium is a plurality of discrete and projecting fibers which can be selectively oriented in response to an electrostatic field. The record medium may be unfinished pulp paper or other material which is inherently fibrous or may comprise a supporting base having fibers attached thereto. The fibers can be animal hair, such as wool; plant hair, such as cotton; or synthetic material, such as nylon. It should be understood at the outset, that the invention, in its broader aspects, is not limited to a particular type of fibrous record medium. Any fibrous record medium having the characteristics described above can be employed.

The fiber printing apparatus comprises generally a record medium storage means 11, conditioning means 12, information responsive electrostatic generating means 13 and marking means 14. The record medium is moved past the conditioning means 12 where the fibers are all oriented in a preferred direction and depressed. The electrostatic generating means 13 is then operative to elevate selected ones of the oriented fibers in response to and in accordance with information input signals supplied thereto. The record medium passes to the marking means 14 where the tips of the selected and elevated fibers are inked or otherwise marked to distinguish the same from the fibers which were not elevated and are still depressed. In this manner, the record medium has formed thereon a visual pattern corresponding to the information input signals supplied to the electrostatic generating means 13.

The storage means 11 for the record medium 10 is provided by a pair of reels 16 and 17 disposed in spaced relation with respect to each other. The payoff reel 16 rotatably supports a coil 18 of the fibrous record medium while the reel 17 takes up and stores the record medium which has passed by the conditioning means 12, electrostatic generating means 13 and marking means 14. The take-up reel 17 is driven by a motor 19 which is controlled in a manner to be further explained. The fibers on the record medium supplied from the coil 18 are randomly oriented as represented by the reference numeral 20 in FIGURE 1 of the drawings.

The conditioning means 12 has an electrostatic generator for elevating or extending all of the fibers on the record medium. The electrostatic generator is provided by a plurality of corona discharge wires 22 which are spaced from each other and mounted in a housing 23 in spaced adjacent relation with respect to the fibrous surface of the record medium. A grounded backing plate 24 is disposed on the opposite side of the record medium. The corona discharge wires 22 are connected to a source of voltage, not particularly shown, of the desired polarity and value so that a substantially uniform electrostatic charge is produced across the surface of the record medium. All of the fibers are extended or elevated as illustrated at 24 in the drawings. The remaining portion of the conditioning means 12 comprises a pair of driven ironing rolls 25 and 26 which engage the opposite sides of the record medium. The spacing of the ironing rolls is closely controlled so that the previously elevated fibers are rolled down or depressed but yet the fibrous record medium is not damaged. The fibers 27 are all oriented in a given direction and are all flattened or depressed. The ironing rolls are grounded so that all electrostatic charge is removed from the fibers at this position. The means for driving the ironing rolls will be hereinafter more fully explained.

The electrostatic generating means 13 is operative to elevate selected ones of the depressed and oriented fibers 27 in accordance with information input signals supplied thereto. In this embodiment of the invention, the electrostatic generating means comprises a shaped-beam cathode ray tube 29 having an electron beam gun 30 disposed at the rear end of an envelope 31. The electron beam gun 30 produces an electron beam 32 which passes between horizontal and vertical deflection plates 33 and 34 and impinges upon a stencil-like matrix 35. The matrix has a plurality of characters etched or otherwise formed therein in a coordinate fashion. The character on the matrix 35 which is engaged by the electron beam is controlled by the signals supplied to the pairs of deflection plates 33 and 34 from horizontal and vertical deflection circuits 36 and 37, respectively. In this manner, the signals supplied to the deflection plates determine which symbol or character is selected at any instant.

The shaped electron beam passing from the matrix 35 is subjected to the action of an electromagnetic field produced by horizontal and vertical deflection coils 39 and 40. The signals supplied to the deflection coils 39 and 40 from the horizontal and vertical deflection circuits 36 and 37 determine the position of the projected image of the character on the face 41 of the shaped-beam cathode ray tube 29. The face 41 of the tube comprises a plurality of writing wires 43 which are closely spaced and insulated from each other. The writing wires 43 pass from the inside of the envelope 31 to the outside thereof and define a writing surface on the outside of the face 41 which is a field of wire points. The arrangement is such that the signals supplied to the coordinate deflection plates and coils determine the symbol or character to be printed and the positioning of that character on the face 41 of the cathode ray tube. A charge corresponding to the selected character or symbol is produced on the rear surface of the face 41 and is transferred to the outer surface thereof by the writing wires 43.

The ends of the writing wires are disposed in adjacent relation with respect to the depressed and oriented fibers 27 on the record medium. An electrostatic field, which is shaped and positioned in accordance with the signals supplied to the deflection plates and coils, is created and selected ones 45 of the fibers corresponding to the signals are elevated or extended in response to the electrostatic field. The remainder of the fibers stay in their bent or depressed state.

The horizontal and vertical deflection circuits 36 and 37 are controlled by character selection and synchronizing circuits 46 which are in turn responsive to input information signals. The input information signals can be supplied by a typewriter, punched tape, data processing apparatus or other similar means, depending upon the specific application. The raised fibers 45 on the record medium correspond to the information input signals supplied to the electrostatic generating means defined by the shaped-beam cathode ray tube 29. For those desiring a more detailed explanation of the operation and construction of the tube 29 and the circuitry associated therewith, reference is made to an article by Lawrence W. Collins, Jr., entitled "Permanent Read-Out Certifies Automation's Designs" which appears in the January 1962 issue of Machinery.

The record medium now has a pattern of raised or elevated fibers 45 thereon corresponding to the input information signals and is moved to the marking means 14. As shown in FIGURE 2 of the drawings, the marking means comprises a base plate 50 and a pair of spring loaded shoes 51 which engage the lateral edges of the record medium 10. The base plate and the shoes maintain the record medium flat and taut as is required. Disposed in adjustable spaced relation to the record medium between the shoes 51 is a carrier block 52 which mounts a stylus 53. The stylus 53 extends across the record medium and is adjusted so that it just engages or brushes the tips of the extended and elevated fibers but does not contact the depressed fibers. The stylus 53 may be formed of "Porelon" plastic which has been impregnated with a colored dye, such as methyl-violet in a solution or glycol or the like. The raised or elevated fibers 45 are marked with the colored dye so that the same are easily distinguished from the depressed fibers and a visual representation corresponding to the information input signals is provided.

The record medium is then moved to and passes through a second pair of grounded ironing rolls 54 and 55 which depress the marked fibers. If desired, suitable drying means, such as an electrical heating unit, may be disposed between the ironing rolls 54 and 55 and the shaped-beam cathode ray tube 29. The record medium which is printed with the input information is wound on the takeup reel 17. The record medium can then be coated to provide a glossy finish or otherwise treated as desired.

A motor 56 drives the ironing rolls 54 and 55 and is responsive to signals supplied from the character selection and synchronizing circuits. These signals also control the operation of motor 19 which drives the takeup reel 17. The arrangement is such that the relative movement between the shaped-beam cathode ray tube 29 defining the electrostatic generating means 13 and the fibrous record medium is accurately controlled by and responsive to the information input signals.

Figure 3:
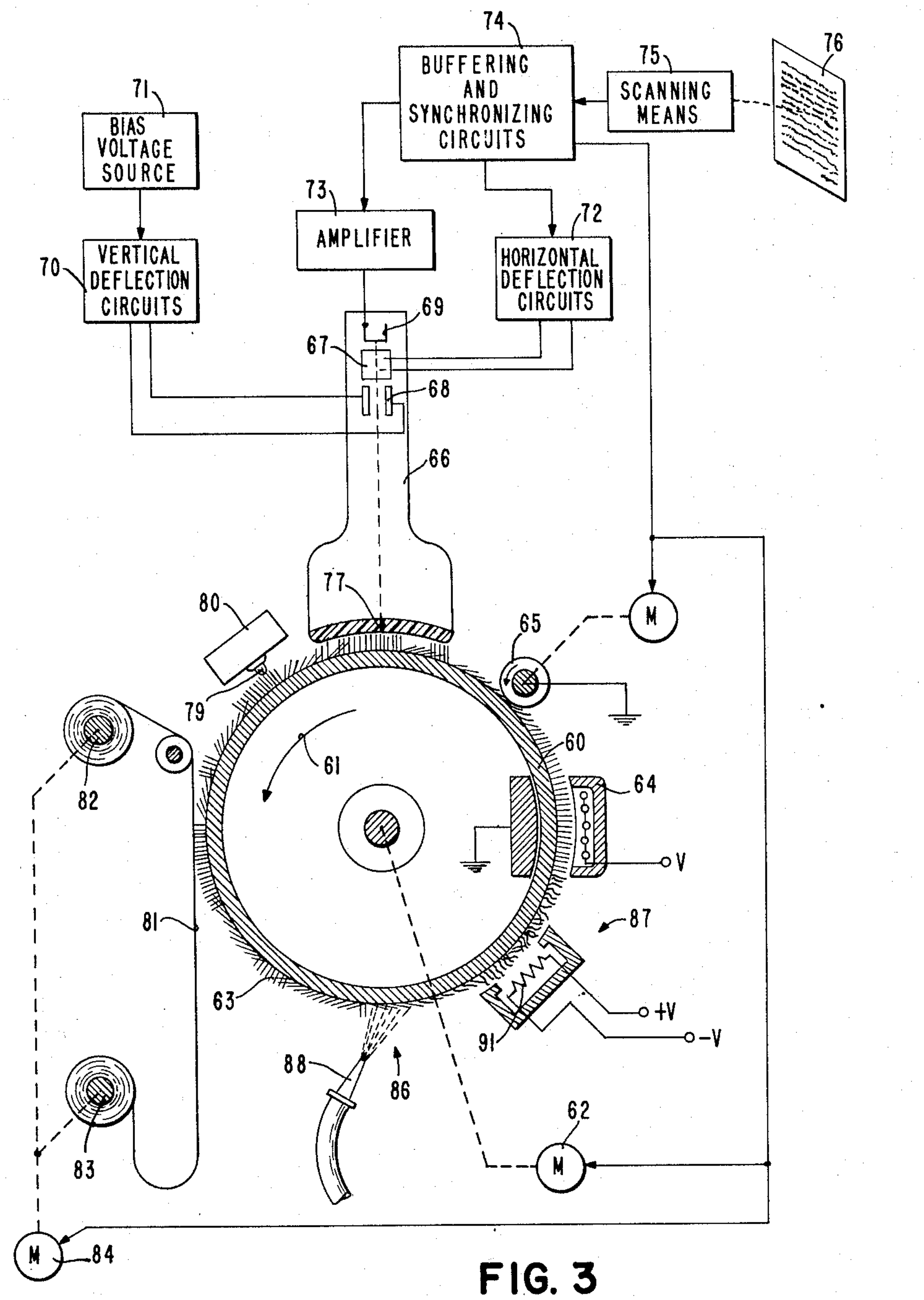
FIGURE 3 is a schematic view of apparatus for practicing another form of the invention.

Referring now to FIGURE 3 of the drawings, there is shown another embodiment of the invention. The fiber printing apparatus is generally the same as that disclosed above with the exception that the record medium is circulated in a closed path and the visual pattern corresponding to the information input signals is transferred from the elevated and marked fibers to a suitable base or carrier. Cleaning means are disposed between the transfer station and the conditioning means to remove all traces of the ink or other marking material from the record medium.

In this embodiment of the invention, the fibrous record medium takes the form of a drum 60 which is rotated in the direction of the arrow 61 by a motor 62. The drum has a fibrous outer periphery 63 formed either by fibers directly attached to the drum or by a fibrous sleeve which is slipped over the drum. A conditioning means is disposed adjacent one area of the drum and is operative to grossly elevate the fibers on the drum and then to orient the same in a preferred direction. The conditioning means comprises an electrostatic generator 64 and an ironing roll 65 which operates in the same manner and for the same purpose as the electrostatic generator and ironing rolls 25 and 26 described in connection with FIGURE 1 of the drawings.

The next station in the direction of rotation of the fibrous drum is provided by an electrostatic generating means. The means comprises a cathode ray tube 66 having a pair of coordinate deflection means 67 and 68 and an electron beam source 69. The vertical deflection means 68 is connected to vertical deflection circuits 70 which are in turn responsive to the output of bias voltage source 71. The horizontal deflection means 67 is connected to horizontal deflection circuits 72 while the grid of the cathode ray tube is driven by amplifier 73. The horizontal deflection circuits 72 and the amplifier 73 receive signals corresponding to the information to be printed from buffering and synchronizing circuits 74. These latter circuits receive the output of a line-by-line scanning means 75, such as an orthicon tube, which senses the information stored in a master document 76. The arrangement is such that the electron beam is swept along a single line horizontally and is modulated by signals from the circuits 74 in accordance with the information on the original document.

The face of the cathode ray tube comprises a horizontal line of spaced writing wires 77 which are insulated from each other and extend to the outer side of the tube. The tube is disposed in adjacent spaced relation with respect to the conditioned (oriented in a preferred direction and depressed) fibers on the surface of the drum and is operative to elevate those of the fibers corresponding to the signals controlling the modulation of the electron beam. The deflection of the electron beam is synchronized with the operation of the scanning means so that the electrostatic field provided by the writing wires causes a pattern of elevated fibers to be produced on the drum on a line-by-line basis. This pattern is representative of the information appearing on the master document 76. The buffering and synchronizing circuits also provide signals which control the operation of the motor 62, the motor for the ironing roll 65 and other drive means to be hereinafter more fully explained.

The portion of the fibrous drum passing from the electrostatic generating means has a pattern of raised or elevated fibers corresponding to the information on the master document. The remainder of the fibers are in their oriented and depressed or bent state at this time. The tips of the elevated fibers are then engaged by a stylus 79 which is saturated with a dye or the like at a marking station 80. The condition of the fibrous record medium at this station is that a visual pattern corresponding to the information on the original document is provided. The bent or depressed fibers are not marked since they do not touch the stylus 79 of the marking means.

The marked tips of the elevated fibers then engage the surface of a moving web-like base or carrier 81 to transfer thereto and imprint thereon an image which is a reproduction of the original document 76. The base or carrier may be of paper, cloth or the like, depending upon the requirements of a given application. The base or carrier is maintained in adjacent spaced relation with respect to the fibrous drum and is fed from a payoff reel 82 to a takeup reel 83. The reels 82 and 83 are driven by a motor 84 which is responsive to control signals from the buffering and synchronizing circuits 74 so that the movement of the base or carrier 81 is synchronized with the rotation of the fibrous drum 60. The visual pattern on the drum is transferred to the moving base or carrier and it will be noted that the base can be of almost any material. The final output copy of the original document does not have to be fibrous in the sense that the surface of the drum 60 or the record medium 10 in FIGURE 1 of the drawings is fibrous. The base or carrier is only engaged by the raised and marked fibers so that the transfer operation can proceed at a high rate of speed and a minimum of power is required. The apparatus is highly simplified and operates in an efficient and quiet manner.

After the pattern of information has been transferred to the moving base or carrier, the rotation of the drum carries the fibers past the cleaning and drying units 86 and 87. The cleaning unit comprises a spray nozzle 88 for directing a spray of a suitable solvent at the fibers. This solvent, which may be methyl-alcohol, acetone or methyl-ethylene ketone when methyl-violet in a solution of glycol is used as the dye, removes any residue of the marking or inking material. The fibers are dried by unit 87 which comprises an electrical heating element 91. If desired, the cleaning unit may include a rinsing station and electrostatic spray apparatus. The fibers are then ready to be conditioned upon further rotation of the fibrous drum. The input information is translated into a visible pattern on the fibrous record medium and is transferred to the base or carrier in a continuous manner.

The electrostatic generating means comprises a shaped-beam cathode ray tube responsive to information input signals in the embodiment disclosed in connection with FIGURES 1 and 2 and a cathode ray tube responsive to the output of a line-by-line scanning means in the embodiment shown in FIGURE 3 of the drawings. These electrostatic generating means may be interchanged in the disclosed embodiments or other types may be employed, depending upon the particular application. In general, the electrostatic generating means receives input signals and produces an electrostatic field whereby a pattern of raised fibers corresponding to the input signals is provided on the fibrous record medium. Either a positive or negative reproduction of the input information can be obtained. In the latter case, the electrostatic generating means would raise or extend those of the depressed and oriented fibers which correspond to the reverse or inverse of the input signals. Further, the making means may comprise a printing roll rather than a stylus and a chemical mordant can be used to accelerate dye penetration of the fibers. Auxiliary blanket rolls may be employed in transferring the visual image from the continuous loop of the fibrous record medium to the carrier or base.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for printing comprising:

a record medium having on at least one surface thereof a plurality of projecting fibers;

means to move said fibrous record medium in a path of travel;

conditioning means disposed adjacent said path of travel at a first point for orienting all of said fibers in one direction and depressing the same;

an electrostatic generating means disposed adjacent said path of travel at a second point;

means to supply information input signals to said electrostatic generating means;

said electrostatic generating means providing an electrostatic field for elevating those of said depressed and oriented fibers corresponding to said information input signals; and marking means disposed adjacent said path of travel at a third point for marking the elevated ones of said fibers so that the same are readily distinguishable from the remaining depressed fibers.

2. Apparatus according to claim 1 further characterized by:

said conditioning means comprising an electrostatic generator for elevating all of said fibers; and an ironing roll having rolling contact with said record medium for depressing and bending all of the elevated fibers.

3. Apparatus according to claim 1 further characterized by:

said electrostatic generating means comprising a cathode ray tube having an electron beam gun producing an electron beam; and means to deflect said electron beam in accordance with said information input signals.

4. Apparatus according to claim 1 further characterized by:

said path of travel for said fibrous record medium defining a closed path;

a movable carrier passing adjacent said path of travel at a fourth point;

the elevated and marked fibers engaging said carrier at said fourth point to transfer an image corresponding to said information input signals to said carrier; and a cleaning means disposed adjacent said path of travel at a fifth point between said fourth point and said first point for removing the residue of the marking material on the elevated and marked fibers.

5. Apparatus for producing a visual image on a record medium corresponding to information input signals comprising:

a record medium having on at least one surface thereof a plurality of projecting fibers;

each of said fibers having a bent and depressed state and an elevated and extended state;

conditioning means for placing all of said fibers in one of said states;

means for receiving information input signals and placing those of said fibers corresponding to said information input signals in the other of said states; and means to mark the fibers in one of said states so that the same are readily distinguishable from the remaining fibers in the other of said states.

6. Apparatus according to claim 5 further characterized by:

a carrier disposed in adjacent relation with respect to said record medium; and the marked fibers in said one of said states engaging said carrier to transfer a visual image corresponding to said information input signals to said carrier.

7. Apparatus for producing a visual image on a record medium corresponding to information input signals comprising:

a record medium having on at least one surface thereof a plurality of projecting fibers;

each of said fibers having a bent and depressed state and an elevated or extended state;

means for receiving information input signals and placing those of said fibers corresponding to said information input signals in one of said states; and means for marking the fibers in one of said states so that the same are readily distinguishable from the remaining fibers in the other of said states.

8. Apparatus according to claim 7 further characterized by:

said means for receiving information input signals including a cathode ray tube.

9. Apparatus for producing a printed copy of a document comprising:

a document to be reproduced;

means to scan said document to provide information input signals corresponding to the information on said document;

a record medium having on at least one surface thereof a plurality of projecting fibers;

each of said fibers having a bent and depressed state and an elevated or extended state;

means for receiving said information input signals and placing those of said fibers corresponding to said information input signals in one of said states; and means for marking the fibers in one of said states so that the same are readily distinguishable from the remaining fibers in the other of said states to provide a copy of said document.

10. Apparatus according to claim 9 further characterized by:

a carrier disposed in adjacent relation with respect to record medium; and the marked fibers in said one of said states engaging said carrier to transfer thereto a visual image corresponding to said information input signals.

11. Apparatus for printing comprising:

a record medium having on at least one surface thereof a plurality of projecting fibers;

conditioning means for orienting all of said fibers in one direction and depressing the same;

an electrostatic generating means;

means to supply information input signals to said electrostatic generating means;

said electrostatic generating means providing an electrostatic field for elevating those of said depressed and oriented fibers corresponding to said information input signals; and means to mark the elevated fibers corresponding to said information input signals so that the same are readily distinguishable from the remaining and depressed fibers.

12. Apparatus for producing a visual image on a record medium corresponding to information input signals comprising:

a record medium having on at least one surface thereof a plurality of projecting fibers;

means to move said fibrous record medium in a path of travel;

each of said fibers having a bent and depressed state and an elevated and extended state;

a conditioning means disposed adjacent said path of travel adjacent one point for placing all of said fibers in one of said states;

means for receiving said information input signals;

means disposed adjacent said path of travel at a second point for placing those of said fibers corresponding to said information input signals in the other of said states; and marking means disposed adjacent said path of travel at a third point for marking those fibers in one of said states.

References Cited in the file of this patent

UNITED STATES PATENTS

| | | |
|---|---|---|
| 2,128,631 | Eaton | Aug. 30, 1938 |
| 2,932,548 | Nau et al. | Apr. 12, 1960 |
| 2,996,573 | Barnes | Aug. 15, 1961 |